US012318043B2

United States Patent
Quinesser (10) Patent No.: US 12,318,043 B2
(45) Date of Patent: Jun. 3, 2025

(54) KITCHEN APPARATUS AND METHOD FOR SPIRALIZING A FOODSTUFF

(71) Applicant: KONINKLIJKE PHILIPS N.V., Eindhoven (NL)

(72) Inventor: Albert Quinesser, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 969 days.

(21) Appl. No.: 17/272,954

(22) PCT Filed: Sep. 19, 2019

(86) PCT No.: PCT/EP2019/075120
§ 371 (c)(1),
(2) Date: Mar. 3, 2021

(87) PCT Pub. No.: WO2020/064488
PCT Pub. Date: Apr. 2, 2020

(65) Prior Publication Data
US 2021/0267417 A1    Sep. 2, 2021

(30) Foreign Application Priority Data
Sep. 24, 2018   (EP) .................................... 18196238

(51) Int. Cl.
*A47J 43/07*   (2006.01)
*B26D 3/11*    (2006.01)
(Continued)

(52) U.S. Cl.
CPC ............. *A47J 43/0705* (2013.01); *B26D 3/11* (2013.01); *B26D 3/26* (2013.01); *B26D 2007/0018* (2013.01)

(58) Field of Classification Search
CPC ........... A47J 43/0705; B26D 3/26; B26D 3/11
See application file for complete search history.

(56) References Cited

U.S. PATENT DOCUMENTS 2,464,993 A  *  3/1949  Ross ......................... B26D 3/11
                                                                99/589
2,715,927 A  *  8/1955  Cupper .................... B26D 3/22
                                                                99/537
(Continued)

FOREIGN PATENT DOCUMENTS

CN    106363682 A    2/2017
CN    106393239      2/2017
(Continued)

OTHER PUBLICATIONS

International Search Report and Written Opinion Dated Nov. 19, 2019 For International Application No. PCT/EP2019/075120 Filed Sep. 19, 2019.
(Continued)

*Primary Examiner* — Sean M Michalski
(74) *Attorney, Agent, or Firm* — Maschoff Brennan (57) ABSTRACT

Provided is a kitchen apparatus (100) having a spiralizing mode for slicing a foodstuff into a strip or strips, and a further mode which is an alternative to the spiralizing mode. The kitchen apparatus comprises a hand held motorized drive system (102) and a foodstuff engagement tool (104). The foodstuff engagement tool engages with both the drive system and the foodstuff. The foodstuff is thus rotated by the drive system in the spiralizing 5 mode. The drive system is adapted to release the foodstuff engagement tool to enable adoption of the further mode. The kitchen apparatus comprises a cutter (106) adapted to slice the foodstuff into the strip(s) when the rotating foodstuff is advanced onto the cutter. The kitchen apparatus further includes a container (108) having an opening (110). The cutter is mounted on the container in the spiralizing mode such that the container receives the strip(s) via the 10 opening. Further provided is a method for spiralizing a foodstuff.

27 Claims, 5 Drawing Sheets

(51) Int. Cl.
*B26D 3/26* (2006.01)
*B26D 7/00* (2006.01)

(56) References Cited

U.S. PATENT DOCUMENTS

| | | | | |
|---|---|---|---|---|
| 3,952,621 | A * | 4/1976 | Chambos | B26D 3/18 |
| | | | | 99/538 |
| 4,309,823 | A | 1/1982 | Antolino et al. | |
| 4,628,808 | A * | 12/1986 | Simon | B26D 3/11 |
| | | | | 99/593 |
| 4,738,195 | A * | 4/1988 | Berube | B26D 3/185 |
| | | | | 99/590 |
| 5,089,286 | A * | 2/1992 | Geissler | B26D 7/06 |
| | | | | 83/672 |
| 5,138,940 | A * | 8/1992 | Geissler | B26D 7/06 |
| | | | | 83/672 |
| 5,216,031 | A * | 6/1993 | Dobson | B26D 7/01 |
| | | | | 99/538 |
| 5,419,245 | A * | 5/1995 | Short | A47J 19/005 |
| | | | | 100/132 |
| 5,784,942 | A * | 7/1998 | Jones | B26D 7/22 |
| | | | | 83/932 |
| 5,950,528 | A * | 9/1999 | Wang | A23N 7/026 |
| | | | | 99/542 |
| 6,302,014 | B1 | 10/2001 | Kuan | |
| 6,401,605 | B1 * | 6/2002 | Repac | B26D 3/18 |
| | | | | 99/545 |
| 6,854,383 | B2 * | 2/2005 | Wang | A47J 17/16 |
| | | | | 99/542 |
| 8,136,443 | B2 * | 3/2012 | Lee | B26D 3/11 |
| | | | | 99/590 |
| 8,408,108 | B2 * | 4/2013 | Redemann | B26D 7/00 |
| | | | | 83/932 |
| 9,333,659 | B2 * | 5/2016 | Schillheim | A47J 17/02 |
| 9,579,615 | B2 * | 2/2017 | Farrell | B01F 27/00 |
| D782,244 | S * | 3/2017 | Harris | D7/378 |
| 2004/0261634 | A1 * | 12/2004 | Wang | A47J 17/16 |
| | | | | 99/584 |
| 2005/0054948 | A1 * | 3/2005 | Goldenberg | A61B 10/025 |
| | | | | 600/567 |
| 2011/0232505 | A1 * | 9/2011 | Rosenwirth | A47J 43/0705 |
| | | | | 29/428 |
| 2014/0165408 | A1 * | 6/2014 | Schillheim | B26D 3/26 |
| | | | | 30/151 |
| 2017/0280938 | A1 * | 10/2017 | Candler | A47J 43/0711 |

FOREIGN PATENT DOCUMENTS

| | | |
|---|---|---|
| CN | 206123725 | 4/2017 |
| CN | 206123768 | 4/2017 |
| CN | 206123769 | 4/2017 |
| CN | 206166736 | 5/2017 |
| CN | 206185949 | 5/2017 |
| CN | 106983398 A | 7/2017 |
| CN | 206344188 | 7/2017 |
| CN | 107105943 A | 8/2017 |
| DE | 102011082168 | 3/2013 |
| GB | 201801559 | 3/2018 |
| WO | 2016191538 | 12/2016 |
| WO | 2017100859 | 6/2017 |

OTHER PUBLICATIONS

Chefman Ultimate 6-in-1 Food Prep Kit Manual.

* cited by examiner

KITCHEN APPARATUS AND METHOD FOR SPIRALIZING A FOODSTUFF

CROSS REFERENCE TO RELATED APPLICATIONS

This application is the U.S. National Phase application under 35 U.S.C. § 371 of International Application No. PCT/EP2019/075120 filed Sep. 19, 2019, which claims the benefit of European Patent Application Number 18196238.2 filed Sep. 24, 2018. These applications are hereby incorporated by reference herein.

FIELD OF THE INVENTION

This invention relates to a kitchen apparatus and method for spiralizing a foodstuff.

BACKGROUND OF THE INVENTION

In recent years, the process of spiralizing foodstuffs, e.g. fruits and vegetables, has grown in popularity. This has been driven by the need for consumption of healthy fresh food in the daily routine. As the name suggests, spiralizing involves slicing a foodstuff into strips resembling spirals. This effect is achieved by advancing the foodstuff towards a cutter whilst rotating either the foodstuff or the cutter.

Various devices for spiralizing foodstuffs have been brought to market. Such devices may be categorized into manually operated tools, which do not include an electrical motor, and electrical spiralizing appliances.

Continuous rotation is required in order to attain suitably long strips, and thus what is perceived as a good-quality spiralizing result. A weakness of manually operated tools is that the length of the strips may be restricted by the maximum continuous twist that can be performed by hand, e.g. using a suitable handle or simply grasping the foodstuff and twisting it against the cutter. The interruptions to the twisting resulting from the user having to reset his or her grip on the handle or foodstuff may also lead to unwanted inhomogeneity in the sliced product. This inhomogeneity may correspond to a change in diameter or length of the strips, buckles in the strips, flat unspiraled portions in the strips, etc.

Conventional electrical spiralizing appliances either have a rotating cutter or use a rotating foodstuff engagement tool, which is mounted on a handheld electrical device. Hygiene is a key consideration for such spiralizing appliances. The incompatibility of electrical components with water may make it challenging to ensure that the rotating cutter and/or the rotating foodstuff engagement tool are hygienically clean before subsequent use. Moreover, during use there is a risk that the spiralized foodstuff becomes contaminated by unintentional contact with kitchen surfaces. Such issues are particularly problematic when the spiralized foodstuff is intended to be consumed uncooked.

The spiralizing appliance may also present challenges in terms of how the equipment should be accommodated in kitchen spaces which also accommodate other food processing equipment. A lack of available storage may lead to the kitchen work surfaces being occupied by such equipment. This may be undesirable because of, for example, the risk of contaminating equipment being stored, rather than used, on kitchen work surfaces during food preparation which does not require the equipment.

SUMMARY OF THE INVENTION

The invention is defined by the claims.

According to an aspect there is provided a kitchen apparatus having a spiralizing mode for slicing a foodstuff into at least one strip, and a further mode which is an alternative to said spiralizing mode, the kitchen apparatus comprising: a hand held motorized drive system; a foodstuff engagement tool adapted to engage with both the drive system and the foodstuff so as to enable the foodstuff to be rotated by the drive system in said spiralizing mode, wherein the drive system is adapted to release the foodstuff engagement tool to enable adoption of said further mode; a cutter adapted to slice the foodstuff into said at least one strip when the rotating foodstuff is advanced onto the cutter; and a container having an opening, wherein the cutter is mounted on or in the container in said spiralizing mode such that the container receives the at least one strip via the opening.

The hand held motorized drive system engages the foodstuff engagement tool in order for the kitchen apparatus to operate in the spiralizing mode. The foodstuff engagement tool also engages the foodstuff, thereby enabling the drive system to rotate the foodstuff. The hand held motorized drive system may, for instance, be grasped by the user and used to advance the rotating foodstuff onto the cutter in order to spiralize the foodstuff. The drive system may be, for example, regarded as a so-called bar blender-type drive system. The further mode may be selected by releasing the foodstuff engagement tool from the drive system, for instance, following spiralizing. This means that the foodstuff engagement tool may be thoroughly cleaned without compromising the drive system, thereby assisting to minimize the risk of contamination of the spiralized foodstuff. In such an example, the further mode may be regarded simply as a cleaning mode. Moreover, the cutter is mounted on or in a container, which receives the strip(s) during spiralizing. The container may thus assist to prevent the spiralized foodstuff from, for instance, contacting kitchen work surfaces, which further lessens the risk of contamination of the spiralized foodstuff. Thus, the container in combination with the capability to disengage the foodstuff engagement tool from the drive system may make for more hygienic spiralizing.

The kitchen apparatus may comprise at least one additional tool adapted to releasibly engage with the drive system when the foodstuff engagement tool is released from the drive system. The at least one additional tool may, for example, be selected from a blender, a chopper, a whisk arrangement, a masher and a grinder.

The same drive system may thus be utilized to provide modes other than spiralizing, such as blending, chopping, whisking, mashing and/or grinding. This may have a space-saving effect because the modes (or functions) associated with a plurality of conventional pieces of food processing equipment may be implemented using the same drive system. This space-saving effect may, for example, mean less reliance on kitchen work surfaces for storing equipment, with associated kitchen hygiene benefits.

The kitchen apparatus may include a mounting member for mounting the drive system on the container when the drive system is engaged with the additional tool. Preferably, the mounting member is arranged such that the additional tool extends from the mounted drive system into the container. The mounting member may thus act as a bearing member for the additional tool.

Thanks to the mounting member, the same container can be used for spiralizing and with the additional tool. This may, for instance, enable further processing of the spiralized foodstuff and/or processing of additional foodstuff using the additional tool without having to transfer the already spiralized foodstuff into another bowl. The shared container may further provide space-saving benefits, as the kitchen apparatus can have a single container only, for spiralizing, blending, chopping, whisking, mashing, grinding, etc.

The kitchen apparatus may comprise locking means adapted to restrict rotation of the mounting member relative to the container. The locking means may for instance make use of a form fit coupling, for instance a polygon coupling. Because the drive system may drive rotation of the additional tool, the locking means may assist in limiting or preventing the possibility of unwanted rotation of the mounting member by the drive system during use of the additional tool.

The mounting member may comprise a housing for at least partially covering the opening; and an engagement mechanism within the housing, which engagement mechanism engages with both the additional tool and the drive system to enable the additional tool to be driven by the mounted drive system.

The housing may assist to minimize escape of any foodstuff from the container during use of the additional tool. The housing may also provide protection to the user by acting as a barrier for preventing the hands/digits of the user from accessing the interior of the container during use of the additional tool.

The kitchen apparatus may comprise a feeding tube on the container for guiding the rotating foodstuff towards the cutter. The feeding tube may thus enhance the ease with which the user operates the kitchen apparatus in the spiralizing mode, since the feeding tube may enable the user to concentrate more on the pressure he/she is applying to the rotating foodstuff via the hand held drive system, and less on the alignment of the foodstuff relative to the cutter. The feeding tube may also, for instance, provide a protective barrier between the user's hands/digits and the cutter.

The foodstuff engagement tool may be a sliding fit into the feeding tube. The sliding fit may assist guiding of the foodstuff towards the cutter, thereby permitting the user to focus more on the pressure he/she is applying to the rotating foodstuff via the hand held drive system, and less on the alignment of the rotating foodstuff relative to the cutter.

The feeding tube may be detachable from the container. The feeding tube may, for instance, be mounted on the container when adopting the spiralizing mode, and detached after spiralizing for cleaning and/or to facilitate mounting of the drive system on the container when the additional tool is to be used.

The cutter may be detachable from the container. The cutter may, for instance, be mounted on or in the container when adopting the spiralizing mode, and detached after spiralizing for cleaning and/or to facilitate mounting of the drive system on the container when the additional tool is to be used.

When the cutter is detachable from the container, the feeding tube may be detachable independently of the cutter. The cutter may, for instance, act as a cover, e.g. a partial cover, for the container between completion of spiralizing, at which point the feeding tube may be detached, and serving of the spiralized foodstuff.

The kitchen apparatus may comprise further or second locking means adapted to restrict rotation of the feeding tube relative to the container. In this manner, the risk that the rotation of the foodstuff by the drive system also causes rotation of the feeding tube relative to the container may be lessened.

When the kitchen apparatus includes the mounting member and the locking means for restricting rotation of the mounting member relative to the container, the further locking means may comprise: a first locking member on the container; and a second locking member on the feeding tube for engaging with the first locking member in a non-rotatable manner, wherein the locking means comprises: the first locking member; and a third locking member on the mounting member for engaging with the first locking member in a non-rotatable manner.

By the locking means and the further locking means both including the first locking member on the container, switching from using the container for spiralizing to an alternative mode or function, such as blending, chopping, whisking, mashing and/or grinding, may be simplified because the same locking principle is employed for non-rotatable attachment of the feeding tube to the container as for non-rotatable attachment of the mounting member to the container.

The cutter may be non-rotatably mounted onto or in the container. Non-rotatable mounting of the cutter may enhance user safety during spiralizing, e.g. relative to spiralizing devices having rotating blades.

Further locking means may be provided, adapted to restrict rotation of the cutter relative to the container. In this manner, the risk that the rotation of the foodstuff by the drive system also causes rotation of the cutter relative to the container may be lessened.

The locking means for restricting rotation of the cutter may comprise a first locking member on the container and a further locking member on the cutter. The first locking member on the container may be the same locking member that engages with the second locking member on the feeding tube and/or the third locking member on the mounting member. In this manner, the container design may be simplified in that it may only have a first locking member, capable of engaging alternatively or simultaneously with the respective locking member of the 20 cutter, feeding tube and mounting member. Also, since all components can be mounted in a similar way, assembly of the apparatus can be simple, intuitive and foolproof.

The (further) locking means may for instance comprise a bayonet or screw type arrangement. According to a preferred embodiment, the (further) locking means may comprise a form fit arrangement. That is, the cutter, feeding tube and/or mounting member may for instance be provided with a polygonal or sculpted circumference that can engage with a correspondingly shaped inner circumference of the container. In that way, the cutter, feeding tube and/or mounting member can be readily mounted and demounted, simply by lowering the component into, respectively lifting it from the container. No twisting, pressing or other locking manoeuver needed. Also, the form fit arrangement can be free from undercuts, ribs and the like, making it more robust and easy to clean.

The cutter may have an inverted conical shape wherein the or each blade of the cutter may slant upward from the apex of the cutter towards the base. Such conical shape may help to center the food stuff during the cutting process.

In a preferred embodiment, the cutter may have a substantially flat or planar cutting surface. When mounted onto or into the opening of the container, such cutter may lie substantially flush within the opening. The cutter may function as a lid for the container, without taking up considerable space within the container. Also, a flat cutter may be easier to clean than a conical or otherwise curved cutter. In addition, a flat cutter may have a larger effective cutting area, allowing foodstuff of larger dimensions to be processed.

When mounted onto or into the opening of the container, the area of the cutting surface may correspond to that of said opening. In such case, the dimensions of the foodstuff that can be processed by the apparatus can be relatively large, limited only by the size of said container opening, since the or each cutting blade of the cutter may extend across the entire opening.

The cutter may be mounted in the container via an adapter member, wherein the adapter may be arranged to bridge a gap between the container and the cutter. The adapter member may be mounted in the container via aforementioned locking means, a form fit connection, a press fit connection, a screw type, bayonet type, or the like connection. The cutter may be mounted in the adapter member via anyone of aforementioned options. The feeding tube may be mounted in the container via the same or a similar adapter member. The adapter member(s) may increase the freedom of use, where suitably dimensioned adapter members may allow the same cutter and/or feeding tube to be used with different containers of various sizes. Also, with such suitably dimensioned adapter member, the cutter and/or feeding tube may be retrofitted to the containers of existing apparatuses.

According to an alternative embodiment, the cutter may be mounted directly into the container, without adapter member. In such case, the container may be provided with an integrally formed support formation, for supporting the cutter in mounted condition. Such embodiment may be easy to assemble and disassemble.

According to another aspect there is provided a method of spiralizing a foodstuff into at least one strip using a kitchen apparatus having a container with an opening, a foodstuff engagement tool, a hand held drive system for releasibly engaging the foodstuff engagement tool, and a cutter mounted on the container, the method comprising: engaging the foodstuff engagement tool with the drive system; engaging the foodstuff with the foodstuff engagement tool; holding the hand held drive system; rotating the foodstuff using the drive system; and advancing the rotating foodstuff towards the cutter such that the rotating foodstuff is sliced into said at least one strip, which at least one strip passes through the opening into the container.

The method may further comprise releasing the foodstuff engagement tool from the drive system following said spiralizing. Release of the foodstuff engagement tool from the drive system may enable the tool to be thoroughly cleaned prior to a subsequent use.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the detailed description and specific examples, while indicating exemplary embodiments of the apparatus, systems and methods, are intended for purposes of illustration only and are not intended to limit the scope of the invention as defined by the claims. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is a kitchen apparatus having a spiralizing mode for slicing a foodstuff into a strip or strips, and a further mode which is an alternative to the spiralizing mode. The kitchen apparatus comprises a hand held motorized drive system and a foodstuff engagement tool. The foodstuff engagement tool engages with both the drive system and the foodstuff. The foodstuff is thus rotated by the drive system in the spiralizing mode. The drive system is adapted to release the foodstuff engagement tool to enable adoption of the further mode. The kitchen apparatus comprises a cutter adapted to slice the foodstuff into the strip(s) when the rotating foodstuff is advanced onto the cutter. The kitchen apparatus further includes a container having an opening. The cutter is mounted on or in the container in the spiralizing mode such that the container receives the strip(s) via the opening.

The hand held drive system engages the foodstuff engagement tool in order for the kitchen apparatus to operate in the spiralizing mode. The foodstuff engagement tool also engages the foodstuff, thereby enabling the drive system to rotate the foodstuff. The hand held drive system may, for instance, be grasped by the user and used to advance the rotating foodstuff onto the cutter in order to spiralize the foodstuff. The further mode may be selected by releasing the foodstuff engagement tool from the drive system, for instance, following spiralizing. This means that the foodstuff engagement tool may be thoroughly cleaned without compromising the drive system, thereby assisting to minimize the risk of contamination of the spiralized foodstuff. In such an example, the further mode may be regarded simply as a cleaning mode. Moreover, the cutter is mounted on or in a container, which receives the strip(s) during spiralizing. The container may thus assist to prevent the spiralized foodstuff from, for instance, contacting kitchen work surfaces, which further lessens the risk of contamination of the spiralized foodstuff. Thus, the container in combination with the capability to disengage the foodstuff engagement tool from the drive system may make for more hygienic spiralizing.

Figure 1:
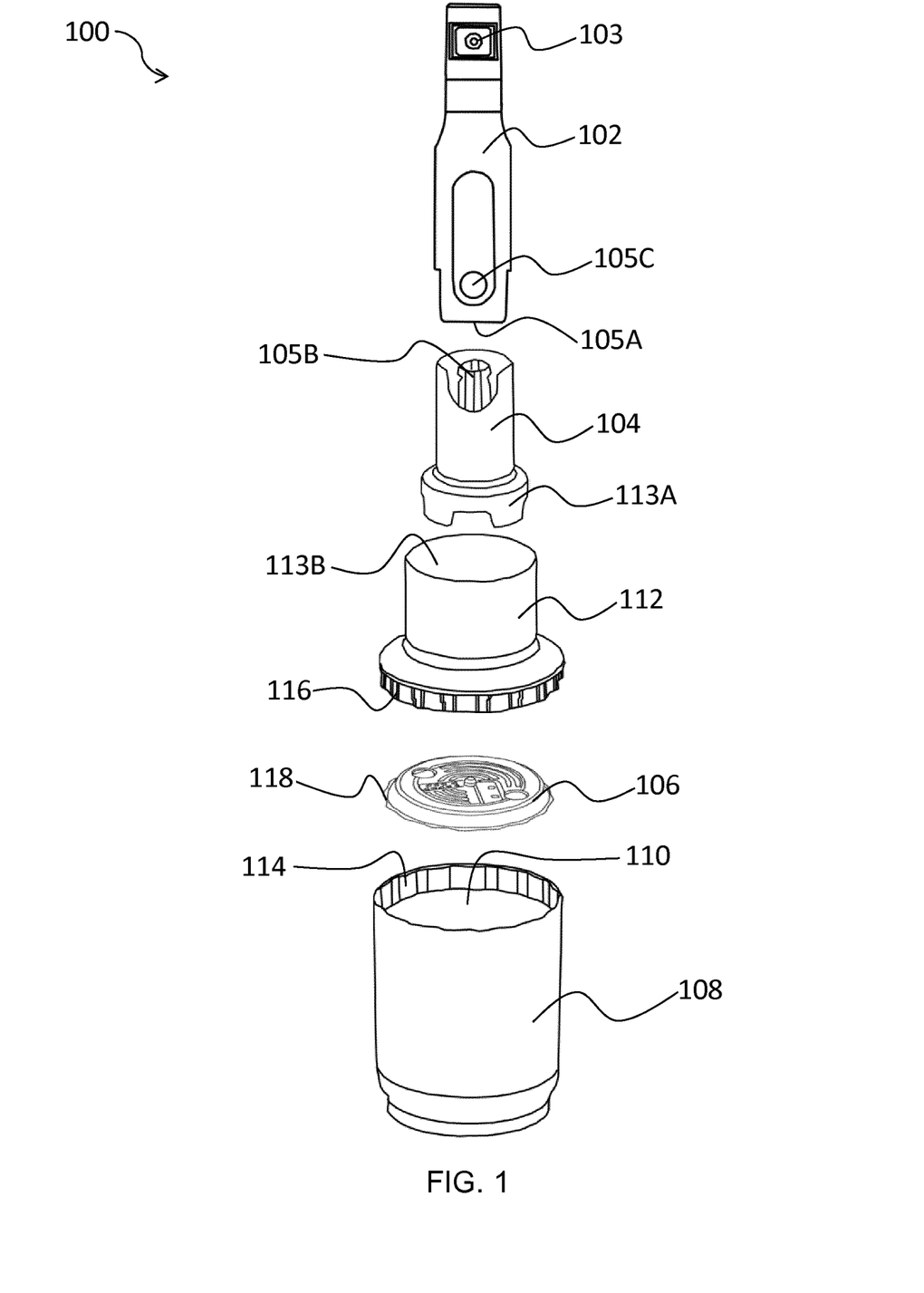
FIG. 1 shows a kitchen apparatus according to an embodiment.

FIG. 1 shows a kitchen apparatus 100 according to an embodiment. The kitchen apparatus 100 shown in FIG. 1 is in a disassembled state, and so may be regarded as a kit of parts, which kit may be supplied to the user. The user may then assemble the kitchen apparatus 100 prior to use. Alternatively, the kitchen apparatus 100 may be supplied in an assembled or partially assembled state, as will be readily appreciated by the skilled person.

The kitchen apparatus 100 comprises a hand held motorized drive system 102. The drive system 102 may be, for example, regarded as a so-called bar blender drive system 102. The drive system 102 engages the foodstuff engagement tool 104 when the kitchen apparatus 100 is to be operated in spiralizing mode. The drive system 102 may include, for example, an electrical motor (not visible) to provide rotation. Power may be supplied to the electrical motor by batteries housed within the drive system 102 and/or by the mains. The drive system 102 may be triggered by the user pressing an on/off switch 103.

In the non-limiting example shown in FIG. 1, a coupling mechanism 105A, 105B transfers rotation from the drive system 102 to the foodstuff engagement tool 104. The coupling mechanism may comprise a drive shaft 105A of the drive system 102 that may, for example, be coupled to a drive member 105B of the foodstuff engagement tool 104, as will be explained in more detail in relation to FIG. 4.

Disengagement of drive system 102 and the foodstuff engagement tool 104 enables adoption of a further mode, which further mode is an alternative to the spiralizing mode. In FIG. 1, the kitchen apparatus 100 is adopting the further mode because the foodstuff engagement tool 104 is disengaged from the drive system 102.

The drive system 102 may disengage, i.e. release, the foodstuff engagement tool 104 in any suitable manner, e.g. by uncoupling the drive shaft 105A from the drive member 105B. A fastening mechanism (not visible in FIG. 1) may, for example, secure the drive shaft 105A to the drive member 105B when the drive system 102 engages the foodstuff engagement tool 104. The fastening mechanism may be released by the user pushing button 105C. Various alternative releasable engagement mechanisms will be immediately apparent to the skilled person.

When the foodstuff engagement tool 104 is released from the drive system 102, the foodstuff engagement tool 104 may be thoroughly cleaned without risking damage to electrical components of the drive system 102. The risk of contamination of the spiralized foodstuff by an inadequately cleaned foodstuff engagement tool 104 may thus be lessened. In such an example, the further mode may be regarded simply as a cleaning mode.

The foodstuff engagement tool 104 further engages with a foodstuff (not shown). The rotation of the drive system 102 is thus transferred to the foodstuff via the foodstuff engagement tool 104. The engagement of the foodstuff may, for example, be achieved via a disc (not visible in FIG. 1) carrying a plurality of projections for penetrating into the foodstuff, which plate is coupled to the drive member 105B. This exemplary embodiment will be explained in more detail in relation to FIGS. 4 and 5.

As shown in FIG. 1, the kitchen apparatus 100 includes a cutter 106. The cutter 106 is mounted on the container 108 when the kitchen apparatus 100 is in the spiralizing mode. The cutter 106 is arranged to slice the rotating foodstuff into a strip or strips as the foodstuff is being advanced onto the cutter 106. The strip or strips then pass into the container 108 via the opening 110. In other words, the cutter 106 is arranged relative to the opening 110 such that the strip or strips being sliced by the cutter 106 pass into the container 108 via the opening 110. In the illustrated embodiment, the cutter 106 is mounted in the opening 110. In an alternative embodiment, the cutter 106 may rest on top of the opening (110).

The collecting of the spiralized strip(s) in the container 108 may assist to prevent the spiralized foodstuff from, for instance, contacting kitchen work surfaces, which lessens the risk of contamination of the spiralized foodstuff. This may be particularly advantageous when the spiralized foodstuff is intended to be consumed uncooked, e.g. in a salad.

The hand held drive system 102 may, for instance, be grasped by the user and used to manually advance the rotating foodstuff onto the cutter 106 in order to spiralize the foodstuff. Advancing the foodstuff manually in this way may permit the user to exert greater control over the quality of the spiralizing result, e.g. the uniformity of the spiralized strip (s), because the user is able to adjust the pressure he/she is applying to the foodstuff in response to the appearance of the strip(s) being produced. In this respect, the container 108 may, for example, be formed of a transparent plastic to enable visual assessment of the strip(s) during spiralizing. Alternative materials may also be contemplated for the container 108, e.g. glass, opaque plastic, and so on.

Whilst manual advancement of the rotating foodstuff may be preferable for the abovementioned reasons, in alternative non-limiting examples an advancement mechanism (not shown) may be included in the kitchen apparatus 100 for effecting automatic advancing of the rotating foodstuff onto the cutter 106.

The container 108 may be designed to rest, for instance, on the kitchen worktop during use. For this reason, the container 108 may include suitable feet, e.g. rubber suction feet, and/or a non-slip rim extending around the bottom of the container 108 for contacting the worktop, to minimize slipping of the container 108 on the worktop during use.

FIG. 1 shows the cutter 106 detached from the container 108. FIG. 1 thus depicts an embodiment in which the cutter 106 is detachable from the container 108. The cutter 106 may, for instance, be mounted on or in the container 108 when adopting the spiralizing mode, and detached after spiralizing for cleaning and/or to facilitate mounting of the drive system 102 on the container 108 when an additional tool (not shown in FIG. 1) is to be used.

The kitchen apparatus 100 shown in FIG. 1 comprises a feeding tube 112 for guiding the rotating foodstuff towards the cutter 106. The feeding tube 112 may thus enhance the ease with which the user operates the kitchen apparatus 100 in the spiralizing mode, since the feeding tube 112 may enable the user to concentrate more on the pressure he/she is applying to the rotating foodstuff via the hand held drive system 102, and less on the alignment of the foodstuff relative to the cutter 106. The feeding tube 112 may also, for instance, provide a protective barrier between the user's hands/digits and the cutter 106. The feeding tube 112 may therefore be formed from a suitably strong and durable material, such as a plastic, metal, metal alloy, etc. Plastic may be preferred to ensure that the feeding tube 112 is also sufficiently lightweight and cost-effective to produce.

The foodstuff engagement tool 104 may be a sliding fit into the feeding tube 112. At least a portion of the foodstuff engagement tool 104 may be dimensioned such that an outer surface 113A of the portion may contact and slide against an interior surface 113B of the feeding tube 112 during spiralizing. Such a sliding fit of the foodstuff engagement tool 104 in the guiding tube 112 may assist guiding of the foodstuff towards the cutter 106.

The feeding tube 112 may be detachably mounted on the container 108. FIG. 1 shows the feeding tube 112 detached from the container 108. The feeding tube 112 may, for instance, be mounted on the container 108 when adopting the spiralizing mode, and detached after spiralizing for cleaning and/or to facilitate mounting of the drive system 102 on the container 108 when an additional tool (not shown in FIG. 1) is to be used.

The kitchen apparatus 100 may comprise (further) locking means 114, 116 for preventing rotation of the feeding tube 112 relative to the container 108 during spiralizing. The (further) locking means 114, 116 may for instance comprise a polygonal or a sculpted coupling between the container 108 and the feeding tube 112, as shown in FIG. 1. A polygonal or sculpted inner surface 114, which may be regarded more generally as a first locking member 114, of the container 108 engages with a complementing polygonal or sculpted lip 116, which may be regarded more generally as a second locking member 116, on the feeding tube 112. The polygon or sculpted coupling 114, 116 may assist to limit or prevent unwanted rotation of the feeding tube 112 relative to the container 108 during spiralizing. Alternatives to the polygon locking means may also be contemplated, such as another form fit geometry or a bayonet catch.

In FIG. 1, both the cutter 106 and the feeding tube 112 are detached from the container 108. However, the cutter 106 and the feeding tube 112 may be attached/detached from the container 108 independently of each other.

Figure 2:
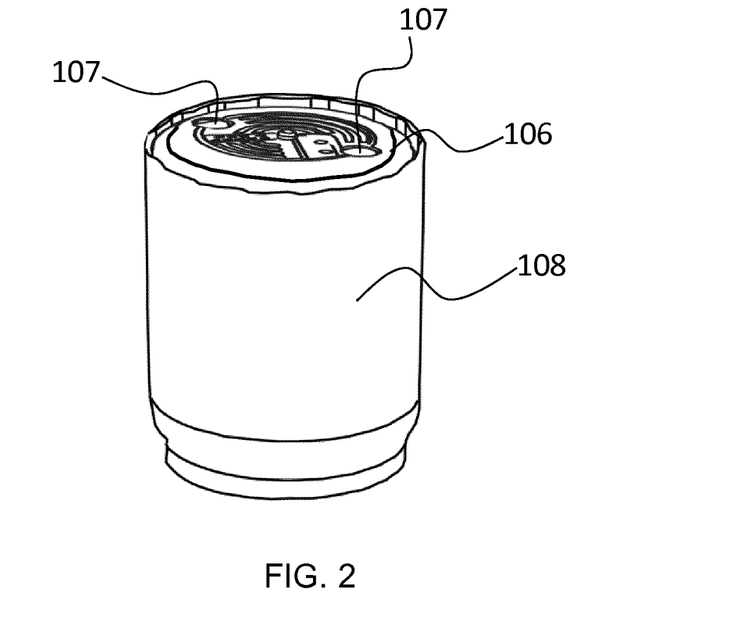
FIG. 2 shows the container and the cutter of the kitchen apparatus shown in FIG. 1.

In FIG. 2, the cutter 106 is mounted on the container 108 but the feeding tube 112 is not. As shown in FIG. 2, the cutter 106 may act as a cover, e.g. a partial cover, for the container 108 between completion of spiralizing, at which point the feeding tube 112 may be detached, and serving of the spiralized foodstuff.

The cutter 106 may include at least one aperture 107 for a finger of a user, to facilitate mounting/demounting.

The cutter 106 may function as a lid for the container 108, to limit or prevent the spiralized foodstuff from falling out of the container 108 prior to serving. Alternatively or additionally, the kitchen apparatus 100 may include a separate lid (not shown) for covering the opening 110. Such a lid may, for example, make an airtight connection with the container 108 in order to help preserve the food, e.g. spiralized food, contained therein.

Figure 3:
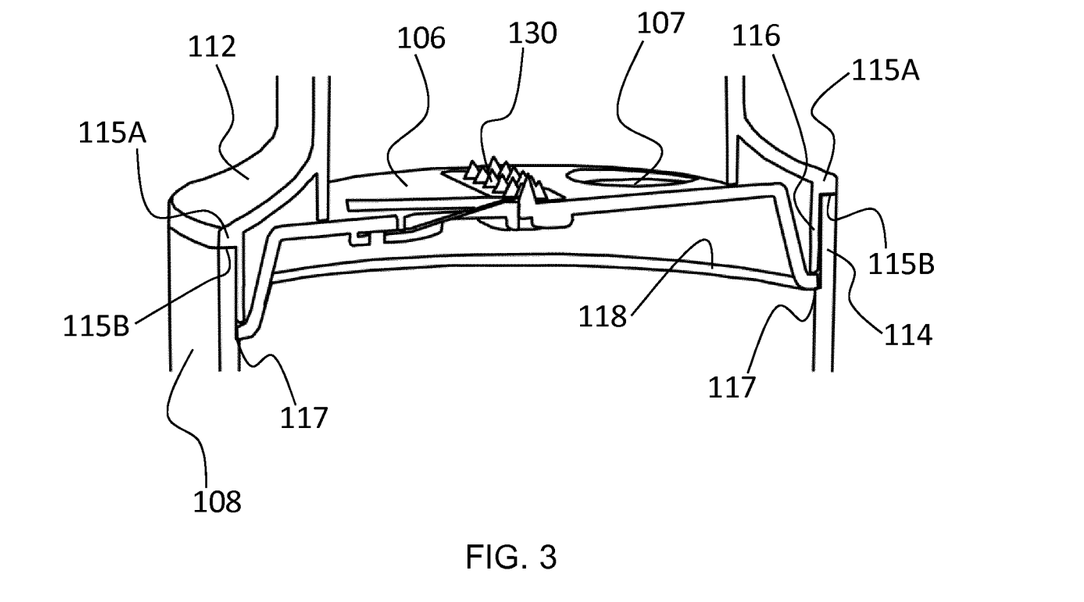
FIG. 3 provides a cutaway view of an assembled portion of the kitchen apparatus shown in FIG. 1.

FIG. 3 provides a cutaway view of an assembled portion of the kitchen apparatus 100 when the cutter 106 and the feeding tube 112 are both mounted on the container 108. In this example, the feeding tube 112 includes a protruding lip 115A which permits the feeding tube 112 to rest on a top rim 115B of the container 108. The cutter 106 is mounted on an annular ledge 117, which extends around the inside of the container 108.

As previously described, the (further) locking means 114, 116, in the form of a polygon or sculpted coupling 114, 116 in this non-limiting example, serves to limit or prevent rotation of the feeding tube 112 relative to the container 108. Moreover, the cutter 106 may also comprise a corresponding polygonal or sculpted outer rim 118, which is shaped to complement the polygonal or sculpted inner surface 114 of the container 108. In this manner, the polygonal outer rim 118, which may be regarded more generally as a further locking member 118, of the cutter 106 may restrict rotation of the cutter 106 relative to the container 108 during spiralizing.

The further locking member 118 in this non-limiting example may thus enable the cutter 106 to be non-rotatably mounted on or in the container 108. Non-rotatably mounting the cutter 106 on or in the container 108 in the spiralizing mode may enhance user safety during spiralizing, e.g. relative to spiralizing devices having moving/rotating cutters.

By the second locking member 116 of the feeding tube 112 and the further locking member 118 of the cutter 106 both engaging with the first locking member 114 on the container 108, the design of the kitchen apparatus 100 may be advantageously simplified because the number of rotation restricting components on the container 108 may be minimized.

In alternative non-limiting examples, the cutter 106 may be mounted on the container 108 using one coupling type, e.g. a bayonet catch, and the feeding tube 112 may be mounted on the container 108 using a different coupling type, e.g. a polygon coupling.

Figure 4:
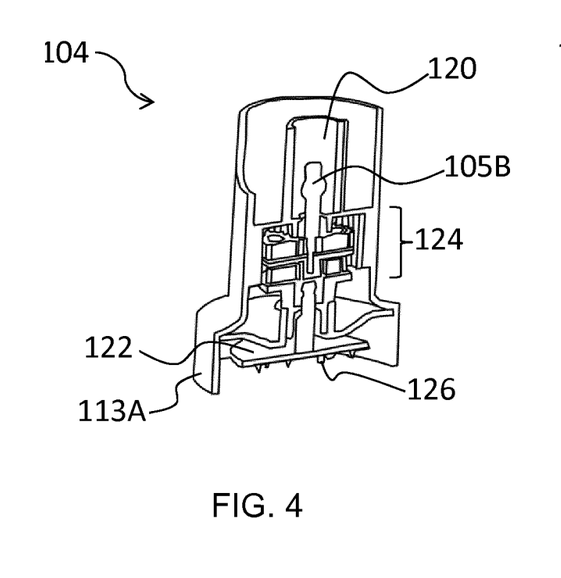
FIG. 4 provides a cutaway view of the foodstuff engagement tool of the kitchen apparatus shown in FIG. 1.

FIG. 4 provides a cutaway view of the foodstuff engagement tool 104. A drive member 105B is located within a recess 120. In this non-limiting example, the drive member 105B may be releasibly coupled to the drive shaft 105A of the drive system 102, as previously described. When the drive member 105B is rotated by the drive system 102, the rotation may be transferred to a disc 122 via a gear arrangement 124. In this manner, the drive system 102 may rotate the disc 122 of the foodstuff engagement tool 104. Various alternative internal designs for the foodstuff engagement tool 104 will be apparent to the skilled person. For example, the gear arrangement 124 may be omitted from the foodstuff engagement tool 104, such that the drive system 102 drives rotation of the disc 122 directly.

Figure 5:
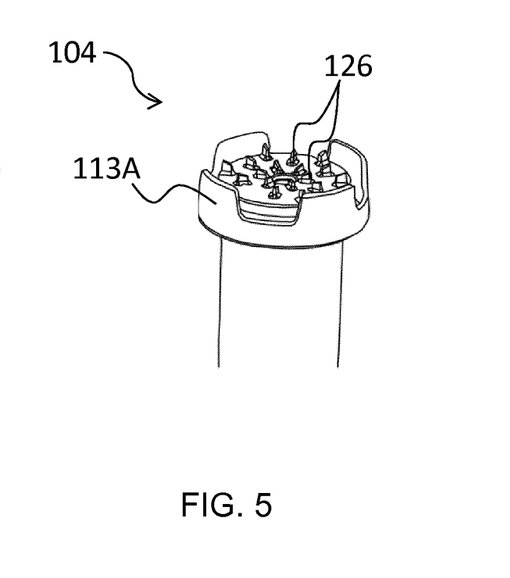
FIG. 5 provides another view of the foodstuff engagement tool shown in FIG. 4.

As shown in more detail in FIG. 5, a plurality of projections 126 may be carried by the disc 122, which projections 126 are for penetrating a foodstuff (not shown) intended for spiralizing. The projections 126 thus enable the foodstuff engagement tool 104 to engage with the foodstuff. Using the projections 126 to engage the foodstuff may enable facile engagement of the foodstuff with the foodstuff engagement tool 104, and convenient removal of any unspiralized remainder of the foodstuff from the foodstuff engagement tool 104 following spiralizing.

The projections 126 may comprise any suitable shape, providing they are able to penetrate the foodstuff, and thus transfer the rotation of the drive system 102 to the foodstuff. The projections 126 may be, for example, in the form of ribs or beads on the surface of the disc 122. At least some of the projections 126 may, for instance, have a shape, which tapers in the direction of the foodstuff, thereby facilitating penetration of the projections 126 into the foodstuff.

As an alternative or in addition to the projections 126 shown in FIGS. 4 and 5, further means for engaging the foodstuff may also be contemplated. For example, the foodstuff engagement tool 104 may include a clamp, a vice, a chuck etc., for securing the foodstuff to the foodstuff engagement tool 104. They may ensure secure engagement of the foodstuff, which may assist spiralizing because the rotating foodstuff is less liable to slip on the foodstuff engagement tool 104 during slicing.

The foodstuff engagement tool 104 may be formed of any suitable material, such as a plastic, metal or metal alloy, e.g. stainless steel. When the foodstuff engagement tool 104 includes the projections 126, the projections 126 may be formed of material which is the same as or different to that used for the other components, such as the disc 122, of the foodstuff engagement tool 104. In a non-limiting example, both the disc 122 and the projections 126 are formed from a plastic, e.g. via a suitable molding process.

Figure 6:
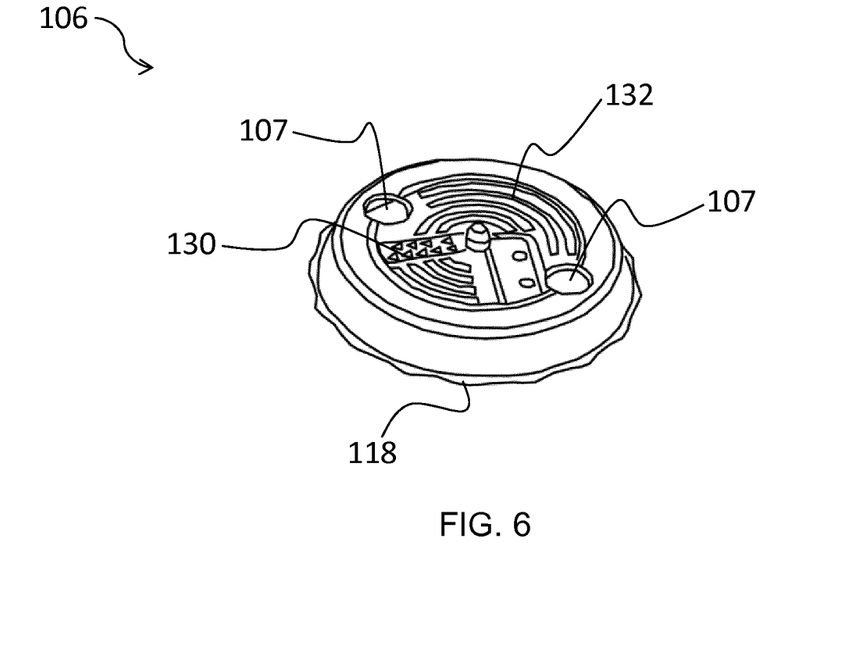
FIG. 6 provides a magnified view of the cutter of the kitchen appliance shown in FIG. 1.

FIG. 6 provides a magnified view of the cutter 106. The cutter 106 may be formed of any suitable material, such as a plastic, metal, metal alloy, e.g. stainless steel, and so on. The cutter 106 may comprise a suitable blade or blades 130 for slicing the rotating foodstuff into a strip or strips. Such a blade 130 may, for instance, be made of a metal, a metal alloy, a ceramic, etc. The blade 130 may be serrated or may not have any serrations, depending on the type of foodstuff which is intended to be spiralized, the desired shape and size of the spiralized foodstuff, etc. The kitchen apparatus 100 may, for instance, be equipped with different, e.g. detachable, cutters 106 according to the desired shape and thickness of the strip(s). In other words, different cutters 106 may be used to cut the foodstuff into differently sized "noodles": spaghetti, ribbons, etc.

As shown in FIG. 6, the cutter 106 may comprises recessed channels 132 for guiding the strip(s) to the blade or blades 130. Numerous alternative cutter designs and spiralizing blades are conceivable such that the particular cutter design shown in the Figures should not therefore be regarded as limiting.

Figure 7:
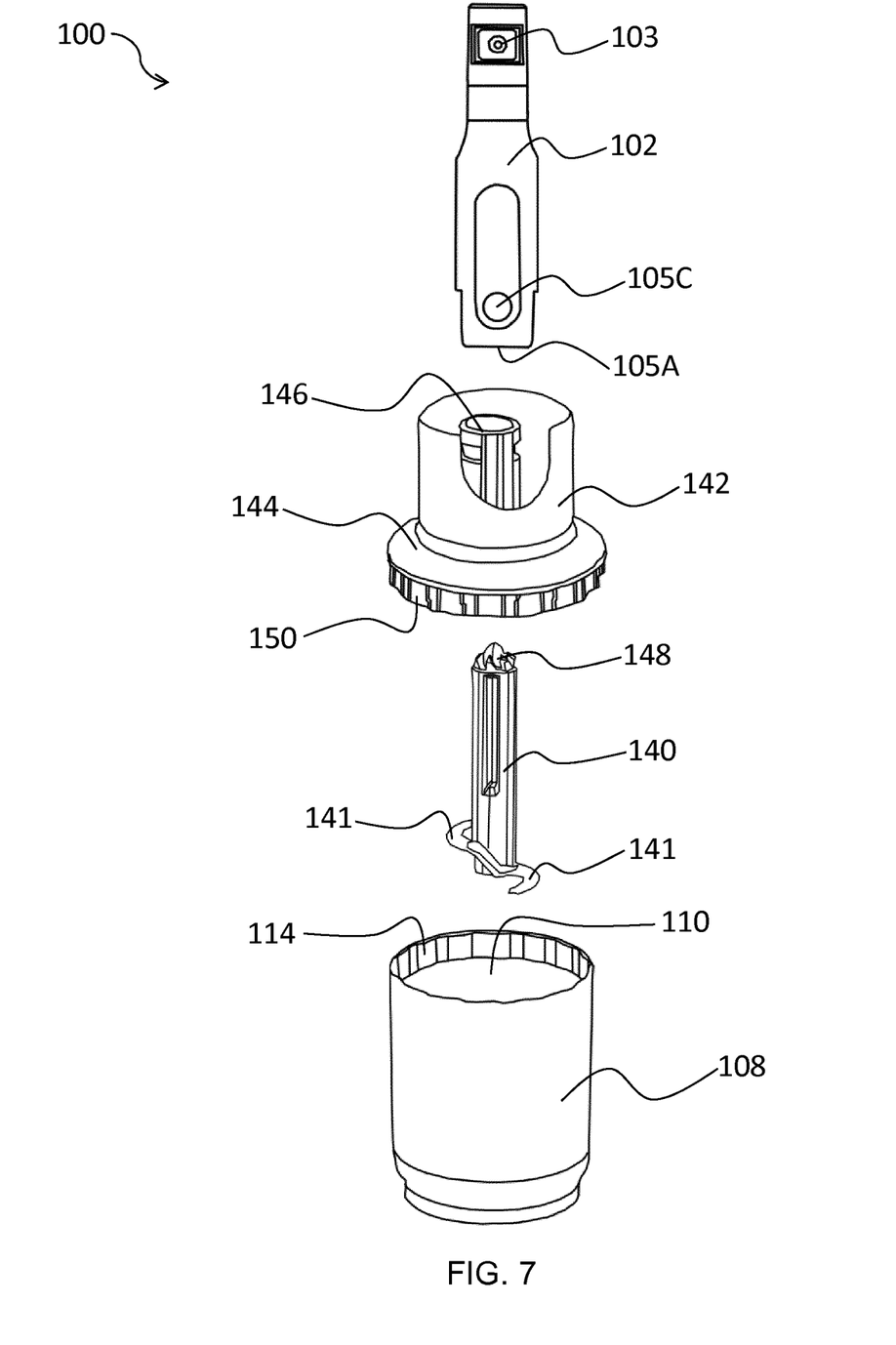
FIG. 7 shows a kitchen apparatus according to another embodiment.

FIG. 7 shows a kitchen apparatus 100 according to another embodiment. In this embodiment, the kitchen apparatus 100 comprises a chopper tool 140 for engaging with the drive system 102; the chopper tool 140 having a chopping blade arrangement 141 for chopping/blending a foodstuff. More generally, the kitchen apparatus 100 may comprise at least one additional tool 140 for engaging with the drive system 102, when the foodstuff engagement tool 104 is released from the drive system 102. The at least one additional tool 140 may, for example, be selected from a blender, chopper, a whisk arrangement, a masher and a grinder.

The whisk arrangement may, for example, comprise a single whisk member, which is rotated by the drive system 102, or may include a plurality of whisk members, which are rotated simultaneously by the drive system 102. Such whisk arrangements, in common with the chopper, masher and grinder tools, are well-known per se, and will not be further described herein for the sake of brevity only.

The same drive system 102 as described above in relation to the spiralizing mode may thus be utilized to provide modes or functions other than spiralizing, such as blending, chopping, whisking, mashing and/or grinding. This may have a space-saving effect because the functions associated with a plurality of conventional pieces of food processing equipment may be implemented using the same drive system 102. This space-saving effect may, for example, mean less reliance on kitchen work surfaces for storing equipment. This may benefit kitchen hygiene because the risk of contaminating equipment during food preparation may be diminished when equipment is not stored on kitchen work surfaces.

As shown in FIG. 7, the kitchen apparatus 100 includes a mounting member 142 for mounting the additional tool 140 on the container 108. Although shown disassembled in FIG. 7, when the mounting member 142 is mounted on the container 108, the additional tool 140 extends into the container 108. This means that the additional tool 140 may blend, chop, whisk, mash, grind, etc. a foodstuff when the foodstuff is placed into the container 108.

In FIG. 7, the mounting member 142 is for mounting on the container 108 instead of, i.e. in place of, the feeding tube 112 and the cutter 106. In other non-limiting examples, the mounting member 142 may be attached to the container 108 when the cutter 106 and/or the feeding tube 112 is or are also attached thereto.

Thanks to the mounting member 142 and the feeding tube 112 being designed to fit on the same container 108, one and the same container 108 can be used for spiralizing as well as for the function(s) of the additional tool 140. This may confer several advantages. For example, using the same container 108 in this manner may enable further processing of the spiralized foodstuff or processing of additional foodstuff using the additional tool 140 without having to transfer the spiralized foodstuff into another bowl. The shared container 108 may also provide space-saving benefits.

The additional tool 140 may releasibly engage with the drive system 102 in a similar manner as described above for the foodstuff engagement tool 104. In the non-limiting example shown in FIG. 7, the mounting member 142 includes a housing 144 for at least partially covering the opening 110 of the container 108. The housing 144 may assist to minimize escape of any foodstuff from the container 108 during use of the additional tool 140. The housing 144 may also provide protection to the user by acting as a barrier for preventing the hands/digits of the user from accessing the interior of the container 108 during use of the additional tool 140. In this respect, the housing 144 may, for instance, be formed of a suitable plastic, metal, metal alloy, etc. Plastic may be preferred for the housing 144 so that the housing 144 may be relatively lightweight and cost-effective to produce.

As shown in FIG. 7, an engagement mechanism 146 housed within the housing 144 engages with both the additional tool 140 and the drive system 102 so as to enable the additional tool 140 to be driven, e.g. rotated, by the drive system 102. The rotation of the drive shaft 105A may, for example, be transferred to the additional tool 140 via a connector 148 on the additional tool 140, which connector 148 locates into the engagement mechanism 146. Depressing the button 105C on the drive system 102 may enable disengagement of the drive system 102 from the additional tool 140/engagement mechanism 146 in a similar manner as previously described for the foodstuff engagement tool 104.

Various alternative means of driving the additional tool 140 using the drive system 102 are conceivable. For example, either one of the housing 144 and the engagement mechanism 146 may be omitted from the mounting member 142. The mounting member 142 may, for instance, simply provide an attachment point for the drive system 102 on the container 108; the additional tool 140 being coupled directly to the drive shaft 105A of the drive system 102.

The kitchen apparatus 100 may comprise locking means 114, 150 adapted to restrict rotation of the mounting member 142 relative to the container 108. In the non-limiting example shown in FIG. 7, the locking means 114, 150 comprises a polygon or sculpted coupling. The polygonal or sculpted inner surface 114, which may be regarded more generally as a first locking member 114, of the container 108 engages with a complementing further polygonal or sculpted lip 150, which may be regarded more generally as a third locking member 150, on the mounting member 142. The locking means 114, 150 may assist to limit or prevent unwanted rotation of the mounting member 142 relative to the container 108 during use of the additional tool 140. Alternatives to the polygon coupling, such as a bayonet catch, may also be contemplated for the locking means 114, 150.

As will be evident from, for instance FIGS. 1 and 7, the locking means 114, 150 and the further locking means 114, 116 may both include the first locking member 114 on the container 108, which is in the form of the polygonal or sculpted inner surface 114 in this non-limiting example. The locking means 114, 150 and further locking means 114, 116 may be regarded as providing a harmonized interface between the respective components. Switching from using the container 108 for spiralizing to an alternative mode, such as blending, chopping, whisking, mashing and/or grinding, may thus be simplified because the same locking principle is employed for non-rotatable attachment of the feeding tube 112 to the container 108 as for non-rotatable attachment of the mounting member 142 to the container 108. This locking principle may be further extended to non-rotatable mounting of the cutter 106 on the container 108, as previously described, which may yet further simplify switching between the respective spiralizing and further modes.

Figure 8:
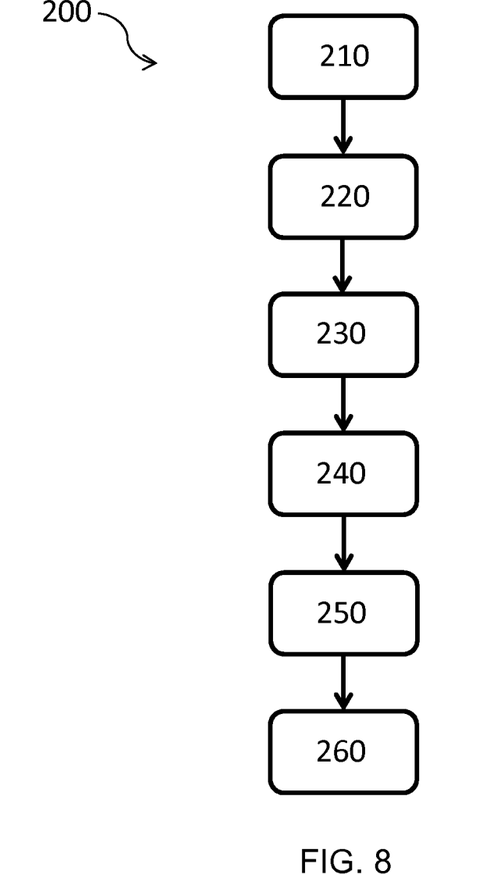
FIG. 8 shows a flowchart of a method according to an embodiment

FIG. 8 shows a flowchart of a method 200 of spiralizing a foodstuff according to an embodiment. The method 200 uses a kitchen apparatus having a container with an opening, a foodstuff engagement tool, a hand held drive system for releasibly engaging the foodstuff engagement tool, and a cutter mounted on the container. The kitchen apparatus may be the kitchen apparatus 100 described above.

The method 200 comprises the step 210 of engaging the foodstuff engagement tool with the drive system. The foodstuff is engaged with the foodstuff engagement tool in step 220. The order of steps 210 and 220 may, for example, be reversed, i.e. such that the foodstuff is engaged with the foodstuff engagement tool before the foodstuff engagement tool is engaged with the drive system.

In step 230, the user holds the hand held drive system. The foodstuff is rotated by the drive system in step 240. In step 250, the rotating foodstuff is advanced towards the cutter such that the rotating foodstuff is sliced by the cutter into a strip or strips. The strip(s) may then pass through the opening into the container.

The method may, for example, comprise the additional step 260 of releasing the foodstuff engagement tool from the drive system following said spiralizing. Release of the foodstuff engagement tool from the drive system enables the tool to be thoroughly cleaned prior to a subsequent use, as previously described. Releasing the foodstuff engagement tool further enables an additional tool, e.g. providing a mode other than a spiralizing mode, to be engaged with the drive system.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A kitchen apparatus having a spiralizing mode for slicing a foodstuff into at least one strip, and a further mode which is an alternative to said spiralizing mode, the kitchen apparatus comprising:
a hand held motorized drive system;
a foodstuff engagement tool adapted to engage with both the drive system and the foodstuff so as to enable the foodstuff to be rotated by the drive system in said spiralizing mode, wherein the drive system is disengaged from the foodstuff engagement tool to enable adoption of said further mode, which is an alternative mode to said spiralizing mode;
a cutter adapted to slice the foodstuff into said at least one strip when the drive system advances the rotating foodstuff onto the cutter; and
a container having an opening, wherein the cutter is mounted on the container when the kitchen apparatus is in said spiralizing mode such that the container receives the at least one strip via the opening.

2. The kitchen apparatus of claim 1, comprising at least one additional tool adapted to releasably engage with the drive system.

3. The kitchen apparatus of claim 2, wherein the at least one additional tool is selected from a blender, a chopper, a whisk arrangement, a masher and a grinder.

4. The kitchen apparatus of claim 2, comprising a mounting member for mounting the drive system on the container when the drive system is engaged with the additional tool, said mounting member being arranged such that the additional tool extends from the mounted drive system into said container.

5. The kitchen apparatus of claim 4, comprising locking means adapted to restrict rotation of the mounting member relative to the container.

6. The kitchen apparatus of claim 5, wherein the locking means comprises a first locking member on the container and a third locking member on a feeding tube.

7. The kitchen apparatus of claim 4, wherein the mounting member comprises a housing for at least partially covering the opening; and
an engagement mechanism within the housing, which engagement mechanism engages with both the additional tool and the drive system so as to enable the additional tool to be driven by the mounted drive system.

8. The kitchen apparatus of claim 1, comprising a feeding tube on the container for guiding the rotating foodstuff towards the cutter.

9. The kitchen apparatus of claim 8, wherein the feeding tube is detachable from the container.

10. The kitchen apparatus of claim 1, wherein the cutter is detachable from the container.

11. The kitchen apparatus of claim 10, wherein, when the cutter is detachable from the container, the feeding tube is detachable independently of the cutter.

12. The kitchen apparatus of claim 8, comprising further locking means adapted to restrict rotation of the feeding tube relative to the container.

13. The kitchen apparatus of claim 12, wherein the further locking means comprises a first locking member on the container and a second locking member on the feeding tube.

14. The apparatus of claim 13, wherein the second locking member on the feeding tube and a third locking member on the mounting member are both adapted to cooperate with the same first locking member on the container.

15. The kitchen apparatus of claim 1, wherein the cutter is non-rotatably mounted on the container, or the cutter is non-rotatably mounted in the container.

16. The kitchen apparatus of claim 1, comprising locking means adapted to restrict rotation of the cutter relative to the container.

17. The kitchen apparatus of claim 16, wherein the locking means comprise a first locking member on the container and a further locking member on the cutter.

18. The kitchen apparatus of claim 17, wherein the feeding tube, the mounting member and/or the cutter each comprise a locking member adapted to cooperate with the first locking member on the container.

19. The kitchen apparatus of claim 1, wherein the cutter is mounted onto or into the opening of the container.

20. The kitchen apparatus of claim 1, wherein the cutter has a planar cutting surface.

21. The kitchen apparatus of claim 19, wherein the area of the cutting surface depends on size of the opening of the container.

22. The kitchen apparatus of claim 1, wherein the cutter is supported by a support formation integrally formed in a wall of the container.

23. The kitchen apparatus of claim 1, wherein the cutter is mounted in the container by means of an adapter member that bridges a gap between the container and the cutter.

24. The kitchen apparatus of claim 8, wherein the feeding tube is mounted in the container via an adapter member.

25. A cutter for use with a container of a kitchen apparatus of claim 1, the cutter having a planar cutting surface, with at least one blade adapted to slice a rotating foodstuff into at least one strip when a rotating foodstuff is advanced onto the cutter.

26. The cutter of claim 25, comprising a polygonal outer rim.

27. A method of spiralizing a foodstuff into at least one strip using a kitchen apparatus having a container with an opening, a foodstuff engagement tool, a hand held motorized drive system for releasably engaging the foodstuff engagement tool, and a cutter mounted on the container, the method comprising:
- engaging the foodstuff engagement tool with the drive system;
- engaging the foodstuff with the foodstuff engagement tool;
- holding the hand held drive system;
- rotating the foodstuff using the drive system; and
- advancing, via the drive system, the rotating foodstuff towards the cutter such that the rotating foodstuff is sliced into said at least one strip, which at least one strip passes through the opening into the container, wherein the method comprises disengaging the foodstuff engagement tool from the drive system following said spiralizing.

* * * * *